United States Patent
Koxlien

(12) 
(10) Patent No.: US 6,932,667 B1
(45) Date of Patent: Aug. 23, 2005

(54) WRIST BAND CALL CONDITIONER FOR FRICTION GAME CALLS

(76) Inventor: Russell Orlin Koxlien, 18381 Park Ridge Rd., Whitehall, WI (US) 54773

( * ) Notice: Subject to any disclaimer, the term of this patent is extended or adjusted under 35 U.S.C. 154(b) by 0 days.

(21) Appl. No.: 10/903,208

(22) Filed: Jul. 29, 2004

(51) Int. Cl.$^7$ .............................................. A63H 33/00
(52) U.S. Cl. ........................ 446/26; 446/474; 446/901; 2/170; 15/210.1; 15/227
(58) Field of Search .......................... 446/26, 28, 474, 446/901, 491; 2/1, 170, 910, 917, 160, 162; 224/219, 267; 15/227, 210.1, 209.1, 222, 15/229.11, 229.12, 229.13

(56) References Cited

U.S. PATENT DOCUMENTS

| | | | | |
|---|---|---|---|---|
| 3,490,766 A | * | 1/1970 | Gardner | 482/105 |
| 4,733,808 A | * | 3/1988 | Turner et al. | 224/219 |
| 5,111,981 A | * | 5/1992 | Allen | 224/620 |
| 5,244,430 A | * | 9/1993 | Legursky | 446/397 |
| 5,283,969 A | * | 2/1994 | Weiss | 40/633 |
| 5,593,073 A | * | 1/1997 | Finnegan | 224/183 |
| 5,716,254 A | * | 2/1998 | Bowes | 446/397 |
| 5,820,000 A | * | 10/1998 | Timberlake et al. | 224/219 |
| 6,540,582 B1 | | 4/2003 | Primos et al. | |

FOREIGN PATENT DOCUMENTS

CH              597852 A5  *  4/1978  ............ A61F 13/10

OTHER PUBLICATIONS

Midwest Turkey Call Supply Catalog-2004 Spring Edition #00893 Friction Call Conditioner; #00894 Friction Kit; p. 20.

* cited by examiner

Primary Examiner—Bena B. Miller

(57) ABSTRACT

A wrist band call conditioner (10) is intended to be conveniently worn around the wrist of a hunter during an active hunt. The wrist band call conditioner is to be used when needed to clean and condition friction game call sound producing surfaces. The wrist band call conditioner has a wrist band (12) that is worn around a hunter's wrist. The wrist band (12) supports an abrasive pad (22), a medium grit cloth backed abrasive (24), and a coarse grit cloth backed abrasive (26) that are fastened to the wrist band (12) using the hook and loop fastener. The hunter can use the abrasives on or off of the wrist band (12) to clean and condition such sound producing surfaces as slate, glass, wood, and metal as needed with minimized hunter motion.

9 Claims, 2 Drawing Sheets

US 6,932,667 B1

WRIST BAND CALL CONDITIONER FOR FRICTION GAME CALLS

CROSS-REFERNCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention generally relates to game calls, and specifically to tools used to condition and clean the sound producing surfaces of friction type game calls.

2. Prior Art

Friction type game calls have been traditionally used for many years for hunting and wildlife observation to attract the desired game. The sound producing surfaces of the friction type game calls require friction to produce the vibrations that create the sounds of the game. For example, the sound producing surfaces of friction type turkey calls include the tip of a striker usually made of wood and a disk shaped surface made of either slate, glass, or a suitable metal. To make the sound producing vibrations with the turkey call, the hunter skillfully moves the striker across the slate, glass, or metal surfaces.

A constant problem associated with these turkey friction type calls is that the sound producing surfaces become worn with use. The striker tip also becomes filled with surface materials which cause it to lose friction and thus its ability to cause the sound producing vibrations. The hunter may encounter these problems while actively calling in a turkey and have the call stop functioning. It is also well known to turkey hunters that it is essential to minimize hunter movement as much as possible while actively calling to a wild turkey. Wild turkeys have very keen eye sight and will spook and run if the hunter's movements are detected.

Previously products have been manufactured that provide the hunter with a multi-tool apparatus such as U.S. Pat. No. 6,540,582 to Primos (2003) and one manufactured by Hunter's Specialties under the name "Friction Call Conditioner", that can be used to condition and clean friction type game calls. These products however require too much hunter movement to be effectively used while the hunter is actively engaged in calling in a wild turkey. These products also need to be carried by the hunter during the hunt either in a pocket or around the hunter's neck on a lanyard. The hunter's neck is also used to carry other hunting items such as turkey locator calls. Locating the call conditioner can cause additional hunter movement because of the tangled mess of other devices around the hunter's neck. Once the call conditioner is located, it requires the hunter's use of both hands to condition the call, one hand to hold the conditioner and the other hand to hold the call or striker. At times, the call or striker may need to be placed on the ground by the hunter to free up a hand to be able to use the conditioner. Another product manufactured by Hunter's Specialties called the "Friction Call Care Kit" is comprised of a pocket sized round container with a cover that contains several conditioning tools inside. It requires the use of two hands to open the container.

The more a hunter moves during the act of calling in a wild turkey, the more likely these movements will be detected by the incoming turkey causing the turkey to spook and run.

OBJECTS AND ADVANTAGES

Accordingly, several objects and advantages of the present invention are:

(a) To provide a wrist band call conditioner for friction game calls which can be used with minimized hunter movement to clean and condition a call while the hunter is actively engaged in the hunt.

(b) To provide a wrist band call conditioner for friction game calls which is securely worn on the hunter's wrist during the hunt and is readily accessible when needed.

(c) To provide a wrist band call conditioner for friction game calls which is worn on the hunter's wrist and is supported by the hunter's wrist which thereby allows the hunter to use it with only one hand.

(d) To provide a wrist band call conditioner for friction game calls which has three conditioning abrasive tools to be used when needed.

Further objects and advantages are to provide a wrist band call conditioner for friction game calls which can be used with game calls of the type known and understood in the relevant art, which is lightweight and easily carried on the hunter's wrist while the hunter is actively hunting, which is of an anti-reflective material, and which allows flexibility of use by permitting the conditioning abrasive tools to be used on or off of the wrist as needed. Still further objects and advantages will become apparent from the following description and drawings.

SUMMARY

In accordance with the present invention a wrist band call conditioner for friction game calls comprises a wrist band that is worn on a person's wrist region and adapted to hold conditioning abrasive tools to condition and clean the sound producing surfaces of friction game calls. The features of the wrist band call conditioner for friction game calls substantially reduces a hunter's movements necessary to condition and clean the friction game calls when needed during an active hunt and thereby increases the hunter's chances of a successful hunt.

DESCRIPTION OF THE DRAWINGS

Preferred embodiments of the invention, illustrative of the best modes in which applicant has contemplated applying the principles of the invention, are set forth in the following description and are shown in the drawings and are particularly and distinctly pointed out and set forth in the claims:

DRAWINGS—LIST OF REFERNCE NUMERALS

10 Wrist Band Call Conditioner
12 Wrist Band
14 First End
16 Rectangle Loop
18 Intermediate Loop Fastener Portion
20 Second End Hook Fastener Portion
22 First Conditioning Abrasive Tool
24 Second Conditioning Abrasive Tool
26 Third Conditioning Abrasive Tool

DETAILED DESCRIPTION OF THE INVENTION

Figure 1:
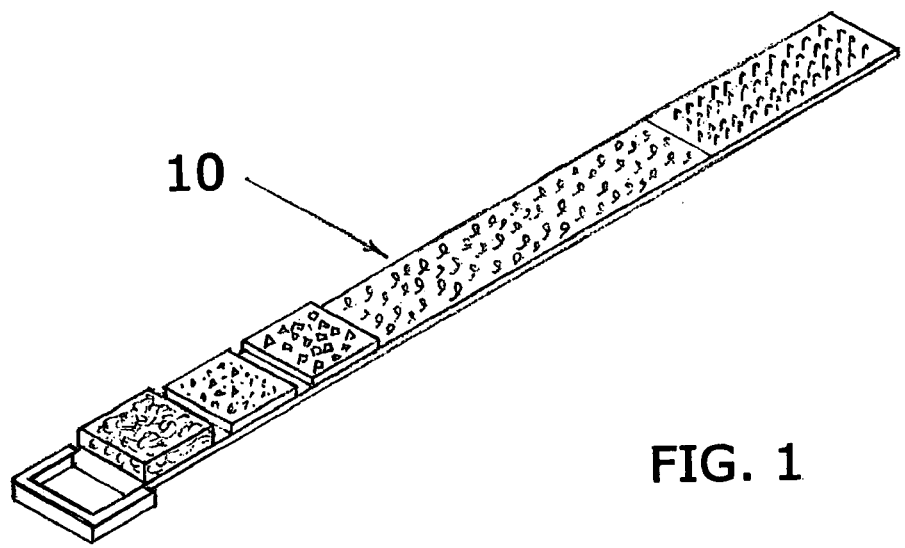
FIG. 1 is a pictorial view of the wrist band call conditioner according to the present invention that shows the various elements of the wrist band call conditioner.

A preferred embodiment of the wrist band call conditioner 10 for friction game calls is illustrated in FIG. 1.

Figure 2:
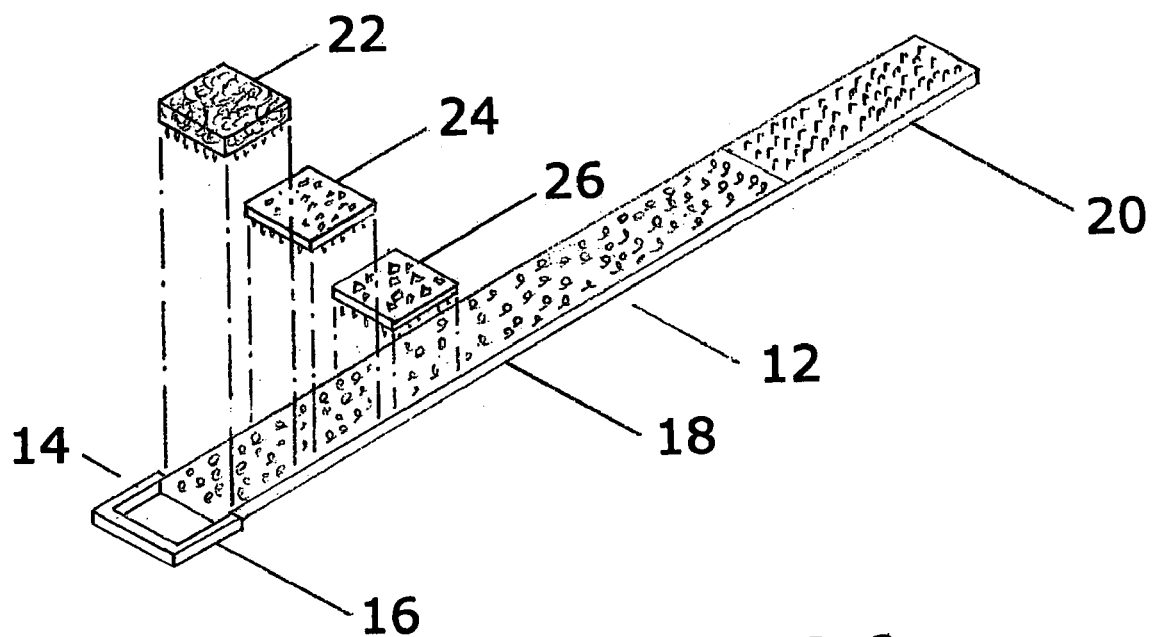
FIG. 2 is an exploded pictorial view of the wrist band call conditioner that shows all of the elements of the wrist band call conditioner.

As shown in FIG. 2, the wrist band friction call conditioner 10 comprises a wrist band 12 defining a first end 14 with rectangle loop 16, intermediate loop fastener portion 18, second end hook fastener portion 20, first conditioning abrasive tool 22, second conditioning abrasive tool 24, and third conditioning abrasive tool 26.

In the preferred embodiment, the wrist band 12 is made of a common fabric material, preferably a non reflective woven nylon substrate, with the hook and loop material applied on a side. The wrist band 12 is of sufficient length to comfortably fit around a hunter's wrist, with or without clothing, and sufficient width to support the three conditioning abrasive tools. The wrist band 12 also has sufficient width to prevent twisting and turning on the hunter's wrist.

As shown in FIG. 2, the intermediate loop fastener portion 18, and the second end hook fastener portion 20 of the wrist band 12 are covered on a side with the hook and loop fastener. The intermediate loop fastener portion 18 is about three-fourths the length of the wrist band 12 and is covered on a side with the loop fastener. The second end hook fastener portion 20 makes up the remaining one fourth of the length of the wrist band 12 and is covered on a side with the hook fastener. The hook and loop fastener material are secured to the wrist band 12 using a suitable fastening method for the fabric.

The rectangle loop 16 on the first end 14 is made of plastic. The rectangle loop 16 is fastened to the wrist band 12 by looping the fabric material through the rectangle loop 16 and securing the fabric material to itself using a suitable fastening method.

The first conditioning abrasive tool 22 as shown in FIG. 2 is comprised of an abrasive pad with a hook fastener adhered to the back side of the pad with an adhesive. The abrasive pad could be the same green abrasive material used in common household scouring pads. The first conditioning abrasive tool 22 is intended to be used to condition all sound producing surfaces used in friction type game calls.

The second conditioning abrasive tool 24 as shown in FIG. 2 is comprised of a medium grit abrasive with a cloth backing material with the a hook fastener adhered to the back side with an adhesive. The second conditioning abrasive tool 24 is intended to be used to condition sound producing surfaces of friction type game calls such as slate, aluminum, and wood.

The third conditioning abrasive tool 26 as shown in FIG. 2 is comprised of a coarse grit abrasive with a cloth backing material with the hook fastener secured to the back side with an adhesive. The third conditioning abrasive tool 26 is intended to be used to condition hard sound producing surfaces of friction type game calls such as glass.

Figure 3:
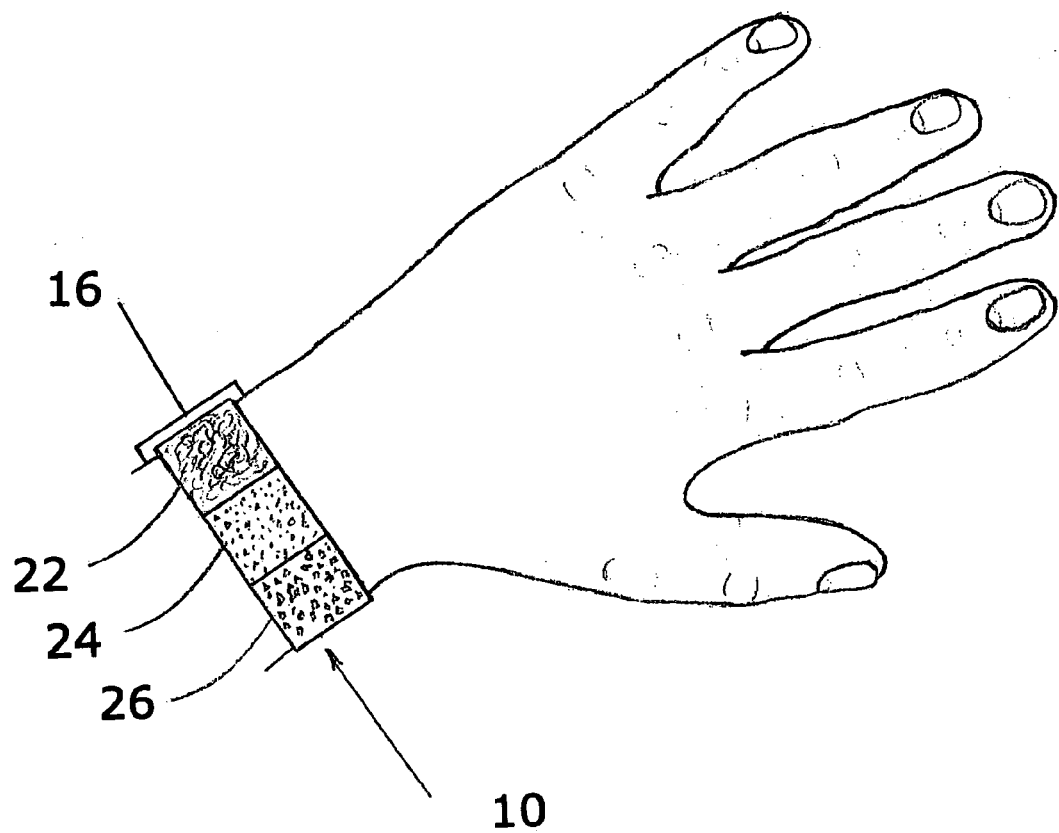
FIG. 3 is a pictorial view of the wrist band call conditioner as it is worn on a user's wrist.

In operation the wrist band call conditioner 10 is worn on a hunter's wrist. The wrist location allows a hunter easy access to the wrist band call conditioner 10 with minimized hunter motion anytime that it is needed. The hunter will usually place the wrist band call conditioner 10 on a wrist while getting dressed for the hunt. To place the wrist band call conditioner 10 on the wrist, the hunter will lay the wrist band call conditioner 10 over the wrist with the intermediate loop fastener portion 18 facing up with the rectangle loop 16 on a side away from the hunter's body. The hunter will then bring the second end hook fastener portion 20 under the wrist and up through the rectangle loop 16 on the first end 14. The hunter will then fasten it by engaging the second end hook fastener portion 20 back onto the intermediate loop portion 18. Once the wrist band call conditioner 10 is on the wrist, the hunter will position the first conditioning abrasive tool 22, the second conditioning abrasive tool 24, and the third conditioning abrasive tool 26 as shown in FIG. 3.

The first conditioning abrasive tool 22, the second conditioning tool 24, and the third conditioning abrasive tool 26 can be used on or off of the wrist band 12 depending upon the need of the hunter. To remove an abrasive from the wrist band 12, the hunter can simply grasp a corner of the chosen abrasive and peel it back to free the hook fastener from the wrist band 12.

Since the wrist band call conditioner 10 is worn on the hunter's wrist, it can be used to clean and condition a striker tip without the hunter having to put down either the call or the striker. When the hunter needs to clean a striker during an active hunt, the hunter can simply move the striker from the call's sound producing surface to the first conditioning abrasive tool 22, the second conditioning abrasive tool 24, and the third conditioning abrasive tool 26 located only a few inches away on the hunter's wrist. On most occasions during the hunt it is not necessary to perform a major cleaning and conditioning on a striker tip, sometimes all that is needed when a call stops sounding properly is to perform a minor cleaning of the striker tip by performing the operation as just described.

Also since the wrist band call conditioner 10 is worn on the hunter's wrist, the wrist is used to support the wrist band call conditioner 10 and the conditioning abrasives fastened to it. Since the wrist band call conditioner 10 is supported by the wrist and not by a hand, the conditioning abrasives can be used by moving only one hand for most cleaning and conditioning operations.

Thus the reader will see that the wrist band call conditioner 10 provides a friction type call conditioner and cleaner that can be effectively and efficiently used during an active turkey hunt because of the minimized hunter motion that it allows.

I claim:

1. A wrist band call conditioner for friction game calls adapted to be worn on a person's wrist region for holding a plurality of call conditioning abrasive tools to be used to condition sound producing surfaces of game calls, the wrist band call conditioner for friction game calls comprises:

a wrist band of a common fabric material of a length and of a width adapted to fit around the wrist region of a person and to hold a plurality of said call conditioning abrasive tools used to condition said friction game calls;

a first conditioning abrasive tool;

a second conditioning abrasive tool;

a third conditioning abrasive tool;

a means for fastening said first conditioning abrasive tool, said second conditioning abrasive tool, and said third conditioning abrasive tool to said wrist band;

a means for adjusting said length of the wrist band to fit a plurality of wrist sizes.

2. A wrist band call conditioner for friction game calls according to claim 1 wherein said wrist band is composed of a non reflective woven nylon substrate with a hook fastener on a side and a rectangle loop on a first end.

3. A wrist band call conditioner for friction game calls according to claim 2 wherein said side of the wrist band further comprises an intermediate loop fastener portion of about three-fourths of said wrist band's said length and the remaining one-fourth of said wrist band's said length is made up of a second end hook fastener portion.

4. A wrist band call conditioner for friction game calls according to claim 1 wherein said first conditioning abrasive is comprised of an abrasive pad material that is bonded to a hook fastener material.

5. A wrist band call conditioner for friction game calls according to claim 1 wherein said second conditioning abrasive is comprised of a medium grit abrasive with a cloth backing material that is bonded to a hook fastener material.

6. A wrist band call conditioner for friction game calls according to claim 1 wherein said third conditioning abrasive is comprised of an coarse grit abrasive with a cloth backing material that is bonded to a hook fastener material.

7. A wrist band call conditioner for friction game calls according to claim 1 wherein said means for fastening said first conditioning abrasive tool, said second conditioning abrasive tool, and said third conditioning abrasive tool to said wrist band is a hook and loop fastener.

8. A wrist band call conditioner for friction game calls according to claim 1 wherein said means for adjusting said length of the wrist band is having the said second end hook fastener portion passing through said rectangle loop and folded back and engaged onto said intermediate loop fastener portion in an amount that can be adjusted allowing said length of the wrist band to fit a plurality of wrist sizes.

9. A wrist band call conditioner for friction game calls according to claim 7 wherein said first conditioning abrasive tool, said second conditioning abrasive tool, and said third conditioning abrasive tool, can be easily removed from said wrist band by disengaging the hook and loop fastener to clean and condition the sound producing surfaces of friction game calls.

* * * * *